Feb. 22, 1955 — R. H. NORRIS — 2,702,870
DYNAMOELECTRIC MACHINE WINDING VENTILATION
Filed Sept. 4, 1952 — 3 Sheets-Sheet 1
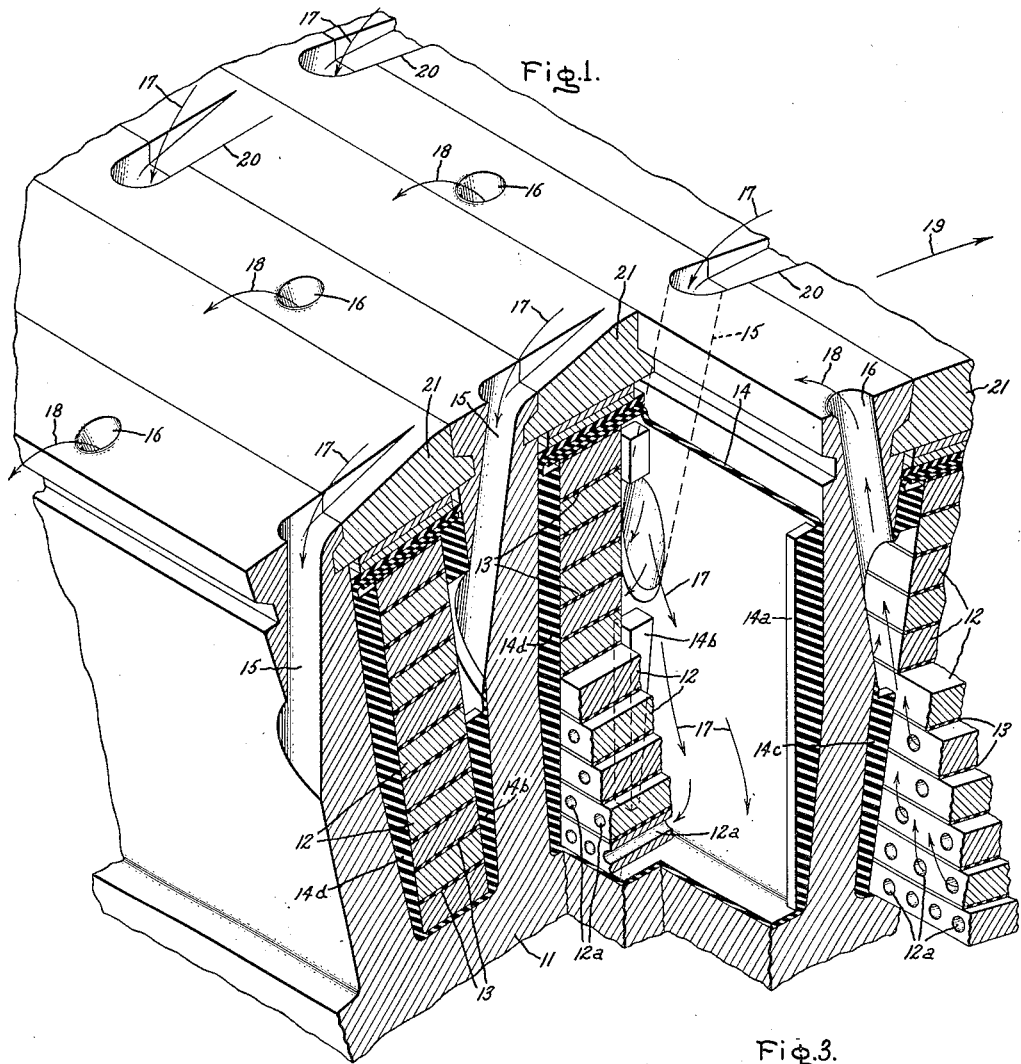
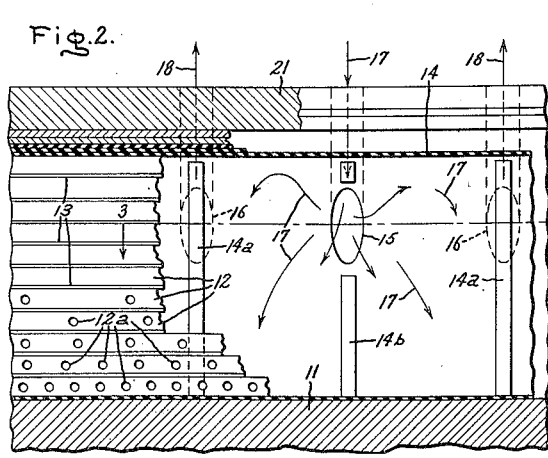
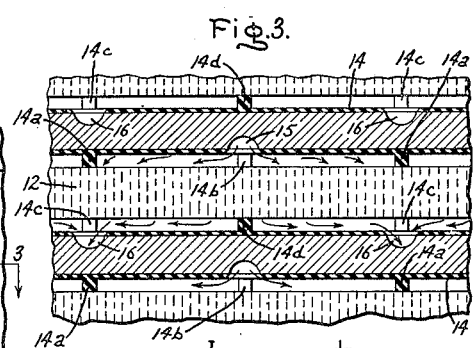
Inventor:
Rollin H. Norris,
by Richard E. Hosley
His Attorney.

Feb. 22, 1955     R. H. NORRIS     2,702,870
DYNAMOELECTRIC MACHINE WINDING VENTILATION
Filed Sept. 4, 1952     3 Sheets-Sheet 2

Inventor:
Rollin H. Norris,
by Richard E. Hesley
His Attorney.

Feb. 22, 1955   R. H. NORRIS   2,702,870
DYNAMOELECTRIC MACHINE WINDING VENTILATION
Filed Sept. 4, 1952   3 Sheets-Sheet 3
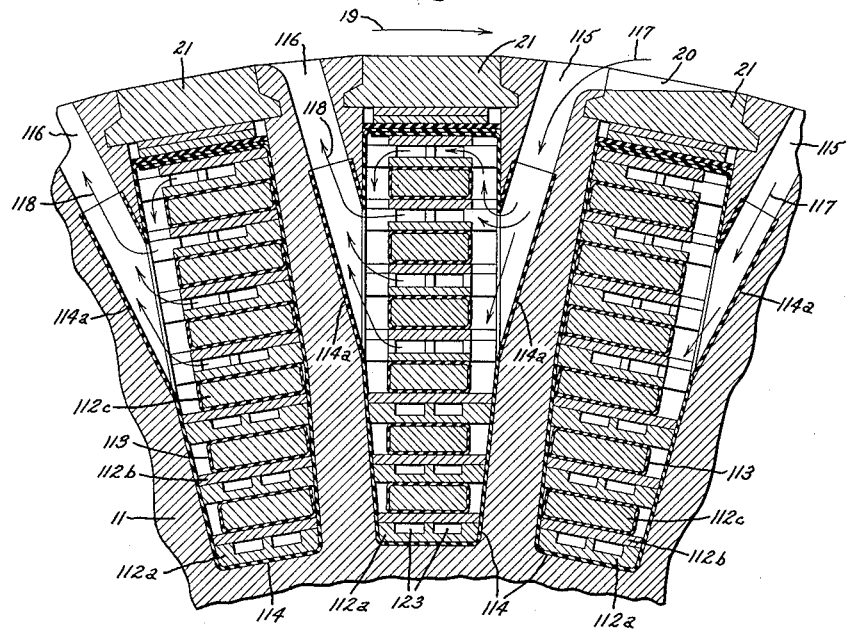
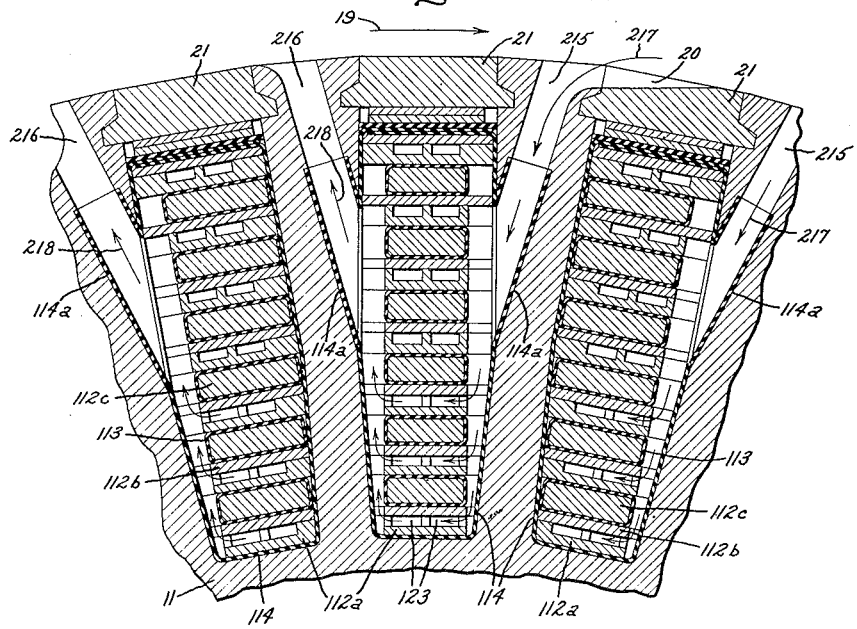
Inventor:
Rollin H. Norris,
by Richard E. Hosley
His Attorney.

United States Patent Office 2,702,870
Patented Feb. 22, 1955

2,702,870

DYNAMOELECTRIC MACHINE WINDING
VENTILATION

Rollin H. Norris, Schenectady, N. Y., assignor to General Electric Company, a corporation of New York Application September 4, 1952, Serial No. 307,743

6 Claims. (Cl. 310—64)

My invention relates to dynamoelectric machines and has particular significance in connection with improvements in ventilating arrangements for windings in slotted rotor core members of large turbine generators.

Conventionally, generators adapted to be driven by steam turbines to supply large amounts of power each have a stationary outer core member having slots containing an armature winding adapted to provide A. C. output when excitation is provided by a rotor core member having slots containing a field exciting winding energized by direct current. The longer the cores and the windings, the more difficult it is to force the requisite cooling gas toward the innermost portions of the imbedded windings, and one of the principal limiting factors affecting the output of such large machines is the temperature rise of the copper conductors making up the windings. It has been proposed by others in the past that in order that this temperature rise will not be affected by the thickness and nature of the insulation surrounding the conductors, coolant fluid should be circulated adjacent the conductor metal and inside the ground or slot insulation. Then, for a given loading, the conductor metal will run cooler and a low temperature rise of insulation can be realized because the heat will not have to pass therethrough. Consequently, there will be less possibility of temperature deterioration of the dielectric characteristics of the insulation. One difficulty with such arrangements in the past, however, has been that it has appeared very difficult to get cooling gas in and out of the channels provided adjacent the conductor material inside the insulation, and other difficulties have been associated with poor heat transfer due to insufficient contact between ventilating medium and hot conductor material and too great a contact of ventilating medium with the cold iron of the core member.

It is an object of the present invention to provide simple and inexpensive means for overcoming the above-mentioned difficulties. A further object of the present invention is to provide improved ventilation and heat dissipation means for use in a dynamoelectric machine core member to increase the rating of a machine of given dimensions, or, alternatively, decrease the required dimensions for a machine of the same rating.

A still further object of the present invention is to provide an arrangement for within-the-insulation-ventilation of electrical conductors occupying slots of a turbine generator rotor core member, which arrangement will permit a more uniform and better distribution of cooling gas with better heat transfer from conductor material to cooling gas than possible with heretofore proposed arrangements.

Briefly stated, in accordance with one aspect of my invention, a turbine generator rotor is provided with winding slots having ground insulation adjacent the slot walls. The individual conductor bars of the winding are separated from this insulation by axially spaced radially extending spacers which define openings between the bars and the insulation. Cooling gas enters from the air gap through a plurality of diagonal inlet ducts extending through the teeth and through holes provided in the insulation, into some such openings, then passes in intimate contact with the conductor material and through passages through some of the conductor bars into other such chambers at the opposite side of the bars in each winding slot and exits through holes provided in the slot insulation, and through diagonal exit passages through the tooth portions and out to the air gap. With this combination of diagonal inlet and outlet holes in the tooth portions for providing air gap gas to pass to and from chambers adjacent the conductor bars, and with passages through the conductors from the downstream end of the diagonal inlet holes to the upstream end of the diagonal outlet holes, a relatively large heat transfer is obtainable at relatively low coolant velocity and with many attendant advantages as hereinafter fully explained.

The features of my invention which are believed to be novel are set forth with particularity in the appended claims. My invention itself, however, both as to its organization and method of operation, together with further objects and advantages thereof, may best be understood by reference to the following description taken in connection with the accompanying drawing, having various figures as follows:

Fig. 1 is a sectional view in perspective of a portion of a turbine generator slotted rotor provided with conductor bar elements of a rotor winding and constructed in accordance with the present invention;

Fig. 2 is a progressively broken-away elevational section through a portion of the rotor of Fig. 1 and diagrammatically showing the flow of coolant fluid on the entry side of the conductor bars;

Fig. 3 is a cross-sectional plan view on the line 3—3 of Fig. 2;

Fig. 5 is a cross-sectional view on the line 5—5 of Fig. 4;

Fig. 6 is a cross-sectional view on the line 6—6 of Fig. 4;

Figure 4:
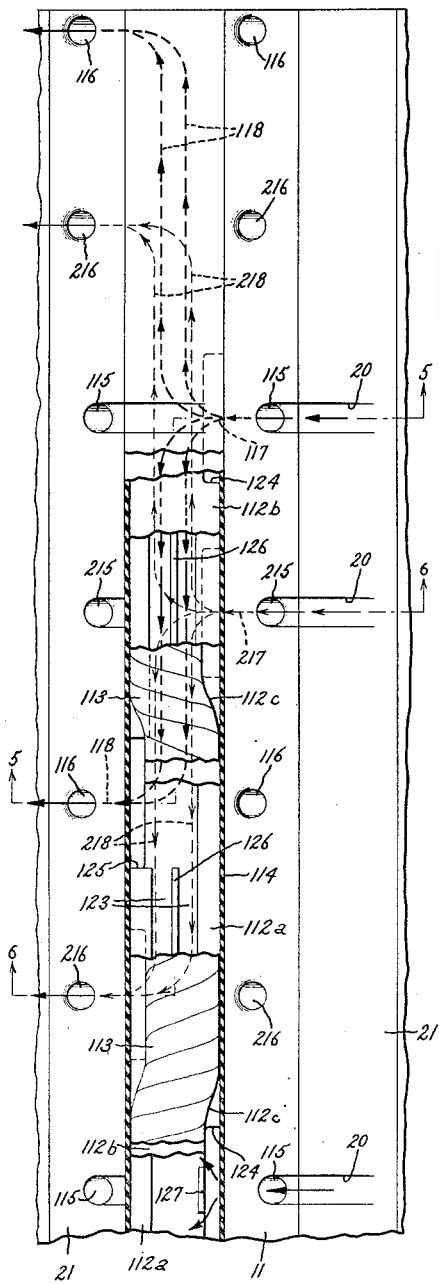
Fig. 4 is a plan view of a rotor core portion progressively broken away in one slot portion, and illustrating a modification.

Referring now to Figs. 1–3, I have shown my invention in connection with a portion of a large turbine generator rotor comprising an annular ferritic core 11 which may be a large forging well over ten feet in length and three feet in diameter. The rotor is provided with axially extending winding slots containing a rotor winding made up of superposed individual conductor bars 12 arranged in the slots and adapted to be energized in conventional manner, such as through slips rings, not shown. In the embodiment shown in Figs. 1–3, adjacent conductor bars are separated by relatively small turn insulation 13, and in each slot the entire assembly of superposed bars 12 and intervening turn or strand insulation 13 is surrounded by slot or ground insulation 14 which is continuous around the sides and bottom walls of each slot and, in the illustrated embodiment, formed integral with this insulation are axially spaced radially extending spacer portions 14a, 14b, 14c and 14d, which space the conductor bars from the major portion of the slot wall insulation 14, thereby forming a plurality of chambers between the spacers and between the conductor bars 12 and the adjacent ground insulation 14 on the slot walls on each side thereof. The core tooth portions (i. e., between the winding slots) are provided with diagonal inlet and outlet ducts communicating with these chambers through corresponding holes in the ground insulation and extending obliquely through each tooth portion intermediate the winding slots to also communicate with the air gap. Thus, as seen in Fig. 1, a plurality of diagonal inlet ducts 15 are provided and may be located about six inches apart axially along each tooth, and intervening therebetween, for example, at three-inch intervals, are a plurality of outlet ducts 16. As will be most clear from consideration of Figs. 2 and 3, in the illustrated embodiment the inlet ducts enter the chambers adjacent the conductor bars exactly at the axial location of alternate spacers 14b, and such spacers 14b are broken away adjacent the inlet opening, but thereabove and therebelow form a vertical barrier adjacent the duct to divide the flow of incoming gas equally to the two adjacent chambers between the conductor bars and the insulated slot wall. The outlet ducts provide communication with chambers at the opposite side of each winding slot and are staggered to be in axial alignment with intervening alternate spacers 14c so that the arrangement provides that each inlet duct 15 will feed one-half of each of two outlet holes because the outlet holes are located adjacent the alternate spacers 14c which are opposite spacers 14a, as most clearly seen in Fig. 3. In accordance with the present invention, communication between chambers between spacers 14a and 14b on the upstream side of the conductor bars on the one hand and the chambers between spacers 14c and 14d on the downstream side of the conductor bars is provided by passages 12a through lowermost conductor bars from the downstream end of the inlet holes 15 to the upstream end of the outlet holes 16. It is to be noted that the number of passages 12a per unit length of conductor may be (as shown) greater in some conductors than in others, so that the number may be chosen to keep each conductor from exceeding desired temperature rise without wasting coolant. The location for the passages 12a is chosen so as to ensure that the coolant circulations will extend to the radially inwardmost conductor bar, and as shown in the drawing (see Fig. 2), the six uppermost bars are not provided with any such passages at all. Natural convection, aided by the centrifugal forces, will tend to circulate the coolant in the chambers between conductors and ground insulation, and thereby cool the sides of all conductors.

In Figs. 1–3, the flow of fluid ventilating medium, which could be any gas or even a liquid but which may be assumed to be hydrogen gas, is indicated by arrows 17 and 18, and in Fig. 1 the arrow 19 indicates the direction of rotor rotation for which it is assumed that the rotor has been built. In operation the rotor will rotate within a concentric stator core (not shown) with a small "air gap" therebetween. In order that the inlet openings 15 may act as scoops for the assumed direction of rotation, each inlet opening 15 at the air gap end thereof has been provided with a chamber 20 in the leading edge of the core tooth and continued through a portion of the periphery of an adjacent slot closing wedge 21.

Figure 7:
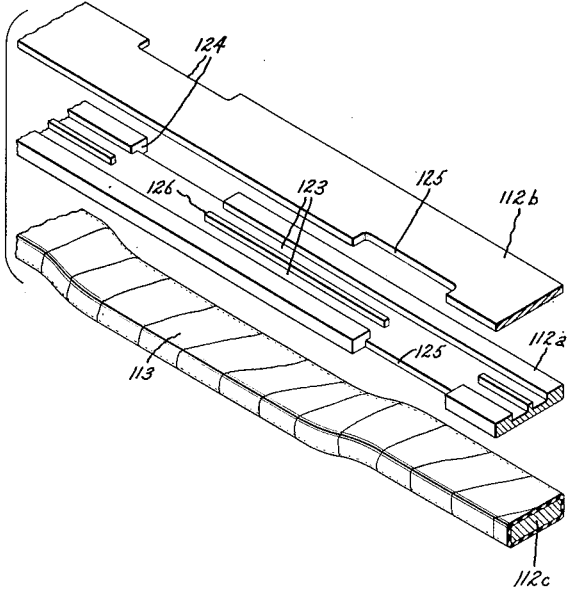
Fig. 7 is a perspective view of a group of three differently fashioned conductors as shown in Figs. 5 and 6.

In a modified form of the invention shown in Figs. 4–7, like parts are like numbered as in the previous figures, and 115—215 and 116—216 are diagonal inlet and outlet passages through the tooth portions of rotor core 11, arrows 117—217 indicating passage of inlet gas, arrows 118—218 indicating passage of outlet gas, arrow 19 indicating direction of rotation, 20 indicating chamber scoop provided for inlets at rotor periphery, and 21 being the slot wedges. As before, the core tooth portions define slots containing superposed conductor bars, but in Figs. 4–7 the bars are arranged in superposed similar groups of unlike conductors and may be thought of as groups each comprising three unlike conductor bars 112a, 112b and 112c. As most clearly seen in Fig. 7, 112c is the only one of the three bars provided with strand insulation (113), and the whole assembly, in each slot, is covered with slot insulation 114 which is shown having tubular portions 114a (Figs. 5 and 6) in the recessed walls of passages 115 and 116 to provide creepage distance of insulation. One of the conductor bars, 112a in the illustrated embodiment, is a bare bar provided with a plurality of intercommunicating transverse and longitudinal grooves 123 which provide an "across-along-across" path for the passage of cooling medium from inlet discharge to outlet intake as hereinafter more fully explained. In order that there will not be concentrated points of mechanical stress adjacent any insulation, the grooves 123 and the ridges thereby defined are not placed adjacent the turn insulation 113, and a bare bar 112b, having flat faces on both top and bottom, is provided to cover these grooves on one side thereof and lie adjacent the insulation 113 of the nearest one of the conductors 112c on the other side thereof. In order to provide vertical communication between groups of conductor bars, each conductor bar 112a and 112b is provided with cut-out notches 124 adjacent the inlet openings and with cut-out notches 125 adjacent the outlet openings, and each insulated conductor bar 112c is fashioned to be wavy so that it zigzags back and forth to provide the proper side clearance adjacent such openings, and thus the conductor bars are configured and arranged to provide radial ducts adjacent the diagonal ducts through the core teeth.

In the embodiment shown in Figs. 4–6, there are two different sets of diagonal inlet ducts and two different sets communicates with uppermost groups of conductors, while the other inlet passages 215 communicate with lowermost groups of conductors; all as will be more apparent from consideration of Fig. 4, in which heavy arrow lines 117—118 represent path of coolant through upper conductors, and light arrow lines 217—218 indicate paths of coolant flow through lower conductors. Likewise, there are two sets of exit ducts, ducts 116 communicating with the discharge through upper conductors (as most clearly seen in Fig. 5), and other exit ducts 216 communicating with lowermost conductors, as most clearly seen in the left-hand side of Fig. 6.

In the longitudinal passages through the conductors as provided by the axially extending portions of grooves 123, the provision of one or more center ribs 126 will add to the conductor cooling surface area, and also contribute to the pressure drop, which may be desirable if, without such a rib, the pressure drop between inlet hole and outlet hole would be so low that it would be insufficient to cause uniform distribution of flow among the many grooves in parallel so that an increase in pressure drop becomes desirable to provide more uniform flow distribution. As shown most clearly in Fig. 7, center groove 126 is cut away adjacent inlet and outlet openings 124—125.

Figure 8:
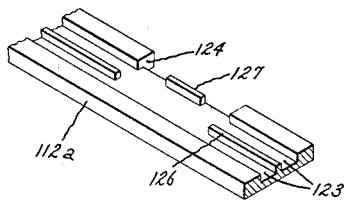
Fig. 8 is a fragmentary view of a conductor provided with a baffle adjacent the inlet opening.

Referring now to Fig. 8, in which like parts have been like numbered as in Fig. 7, I have shown a baffle plate 127 partially closing communication with the axially extending grooves 123 immediately adjacent the vertical inlet opening 124, which is, as previously explained, in the neighborhood of the diagonal gas inlet. This baffle 127 serves to force the incoming coolant gas to distribute itself more uniformly among all the available conductor bars arranged in parallel for coolant flow rather than allowing the coolant flow to concentrate excessively in the first conductor coolant passage it comes to as it leaves the inlet passages 115 and 215. The radially extending spacers 14b of Figs. 1, 2 and 3 serve a similar function although in these earlier figures the spacer arrangement also served to keep the ground insulation and conductor bars separated to provide adequate space for coolant flow.

There is thus provided a device of the character described capable of meeting the objects hereinabove set forth. It has been found that with the arrangement of the invention for relatively long rotors, better heat transfer is obtainable than with known arrangements of the prior art. With the combination of oblique inlet holes and outlet holes in the tooth portions of the rotor, and passages through the conductors from the downstream end of the inlet holes to the upstream end of the outlet holes, there is a relatively large heat transfer obtainable at relatively low coolant velocity. These low coolant velocities are made possible by relatively large total cross section of openings, grooves or passages through the conductor bars themselves, resulting in relatively low pressure drop from inlet hole to outlet hole, thereby resulting in maximum coolant flow and a minimum coolant temperature rise. The low velocity does not result in too low heat transfer coefficient because, although the flow may be laminar, the individual duct cross-section dimensions are small.

With the modifications of Figs. 4–7, there is a distinct advantage in that most of the slot insulation is in direct contact with conductor material, with or without turn insulation, so that to some extent this slot insulation can still perform the function of facilitating flow of some heat from the conductors to the iron and thence to the air gap, a feature which is not so present with the arrangement of Figs. 1–3. Another advantage of the modification is that it provides relatively large surface area between coolant gas and conductor material, and, furthermore, almost all of the metal surface exposed to the coolant gas during its passage from tooth inlet hole to tooth outlet hole is hot conductor and not cold iron (with or without insulation) so that there is a minimum of surface which contributes to friction pressure drop without contributing materially to heat transfer.

It will be noted from Figs. 4–7 (and from Figs. 1–3 as well) that each diagonal inlet duct through core and slot insulation is staggered with respect to the radial duct for the outlet for the same gas in order to lengthen the coolant path by making it along as well as across the conductor from inlet to outlet. While the arrangement conductors will flow first circumferentially to reach the middle of the slotted conductor, then along one or more lengthwise grooves until opposite the outlet hole, and then circumferentially again to reach the outlet, obviously my invention is not to be limited to such an arrangement and somewhat the same effect could be accomplished by having grooves arranged diagonally from similarly located inlets to similarly located outlets. Electrical connection of the individual bars may be made in any desired manner, and the insulated conductor 112c of Figs. 4–7 may be either in series electrically with the uninsulated conductors or in parallel therewith, and, if desired, the uninsulated conductors can be considered as a single conductor, each split into two parts, one with grooves and one without grooves in order to provide a solid ungrooved surface on each side of each insulated conductor to avoid stress concentration of either radial compressive or voltage potential stresses.

It will be noted that axially spaced radial ducts are provided by openings such as the chambers on either side of the conductor bars in Figs. 1–3 or the conductor notches 124–125 in Figs. 4–8, but in the latter case they do not extend the full radial depth of the slots but only over a region long enough radially to feed the particular group of grooves which are to be fed by that duct.

While I have illustrated and described particular embodiments of my invention, various modifications will obviously occur to those skilled in the art. I desire it to be understood, therefore, that my invention is not to be limited to the particular arrangements disclosed, and I intend in the appended claims to cover all modifications which do not depart from the true spirit and scope of my invention.

What I claim as new and desire to secure by Letters Patent of the United States is:

1. In a dynamoelectric machine, a rotor core member provided with winding slots defining tooth portions therebetween, superposed conductor bars arranged in each of said winding slots and spaced from the walls thereof, integral slot insulation arranged adjacent the side and bottom walls of each of said slots and having formed integral therewith a plurality of radially extending axially spaced spacers for spacing the major portion of said slot insulation from the conductor bar sides and defining ventilating chambers between the slot wall portion of said insulation and said sides of said conductor bars, a plurality of diagonally extending inlet ducts passing through said tooth portions and establishing communication between the periphery of said rotor core member and those of said ventilating chambers on one side of the conductor bars in each slot, and a plurality of outlet passages passing diagonally through said tooth portions and establishing communication between those of said chambers on the opposite side of said conductor bars in each slot and the periphery of said rotor core, with the arrangement being such that said inlet passages are axially aligned with alternate ones of said spacers, said alternate spacers being cut away adjacent the inlet passage opening through said insulation to provide an area for ventilating gas to pass into each of the two adjacent ones of said chambers, and said outlet opening through said wall insulation being each adjacent one of other alternating spacers to collect gas from two adjacent ventilating chambers.

2. In a dynamoelectric machine rotor core member provided with winding slots defining tooth portions therebetween, the combination of similar groups of unlike conductor bars disposed in alternating order in each of said winding slots, said tooth portions being provided with diagonal inlet ducts for conducting ventilating fluid from the periphery of the core member to a region adjacent one side of said groups in each slot, outlet ducts for conducting ventilating fluid from a region adjacent the opposite side of said groups in each slot to the periphery of the core member, the conductor bars in said groups being configured and arranged to provide radial ducts between the conductor bars and said diagonal inlet ducts and between the conductor bars and said diagonal outlet ducts, and longitudinally extending passages in the bars of at least one of the groups of bars in each slot establishing communication between the radial ducts adjacent said inlet ducts and the radial ducts adjacent said outlet ducts.

3. A dynamoelectric machine rotor core member having winding slots defining therebetween tooth portions of said core, slot insulation arranged adjacent the walls of each of said slots, a rotor winding arranged in said slots and comprising in each slot superposed groups of bars with each group comprising a bar provided with strand insulation and a bare bar provided with intercommunicating transverse and longitudinal grooves on one side thereof, and a bare bar having flat faces on the top and bottom thereof, means including a wavy configuration of at least some of said insulated bars and notches in the sides of at least some of the bare bars for providing axially spaced radial ducts on each side of the conductor bars inside said slot insulation and communicating with the grooves in at least some of the grooved bars in each slot, means including diagonal inlet ducts passing through the tooth portions from the periphery of said core to the radial ducts within said slot insulation on a first side of said groups of bars for admitting cooling fluid thereto, and means including diagonal outlet ducts passing through the tooth portions from radial ducts on the second side of said groups of bars to the periphery of said core for exhausting cooling fluid.

4. A dynamoelectric machine rotor core member as in claim 3 further characterized by there being two sets of diagonal inlet ducts and two sets of diagonal outlet ducts, with some of said sets of diagonal inlet and outlet ducts communicating with uppermost groups of conductors in each slot and the other of said sets of diagonal inlet and outlet ducts communicating with lowermost groups of conductors.

5. A dynamoelectric machine core member having winding slots defining therebetween tooth portions of said core, main slot insulation arranged adjacent the walls of each of said slots, a winding arranged in said slots and comprising in each slot superposed groups of bars, each group comprising a solid bar provided with an insulating covering and a contiguous bare bar provided with intercommunicating transverse and longitudinal grooves on one side thereof, means for providing axially spaced radial ventilating ducts in each side of the conductor bars inside said main slot insulation and communicating with the grooves in at least some of the grooved bars in each slot, means including diagonal inlet ducts passing through the tooth portions from the periphery of said core to the radial ducts within said slot insulation on the first side of said groups of bars for admitting cooling fluid thereto, and means including diagonal outlet ducts passing through the tooth portions from radial ducts on the second side of said groups of bars to the periphery of said core for exhausting cooling fluid.

6. In a dynamoelectric machine rotor core member provided with winding slots defining tooth portions therebetween, the combination of similar groups of unlike conductor bars disposed in alternating order in each of said winding slots, said tooth portions being provided with diagonal inlet ducts for conducting ventilating medium from the periphery of the core member to a region adjacent one side of said groups in each slot, outlet ducts for conducting ventilating fluid from a region adjacent the opposite side of said groups in each slot to the periphery of the core member, the conductor bars in said groups being shaped and arranged to provide radial ducts between the conductor bars and said diagonal inlet ducts and between the conductor bars and said diagonal outlet ducts, the groups of bars containing at least one bar having a longitudinally extending ventilating passage and at least one of the bars being solid, the longitudinally extending passages in at least one of the bars establishing communication between the radial ducts adjacent said inlet ducts and the radial ducts adjacent said outlet ducts.

References Cited in the file of this patent

UNITED STATES PATENTS

| 1,145,612 | Porter | July 6, 1915 |
| 2,043,120 | Punga | June 2, 1936 |

FOREIGN PATENTS

| 21,822 | Great Britain | of 1912 |
| 654,087 | Germany | Dec. 10, 1937 |
| 714,319 | France | Sept. 1, 1931 |